US010199902B2

(12) United States Patent
Naka et al.

(10) Patent No.: US 10,199,902 B2
(45) Date of Patent: Feb. 5, 2019

(54) AUTOMOTIVE CONTROLLING APPARATUS

(71) Applicant: Mitsubishi Electric Corporation, Tokyo (JP)

(72) Inventors: Shinji Naka, Tokyo (JP); Tadayuki Fujimoto, Tokyo (JP); Keigo Okada, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 226 days.

(21) Appl. No.: 15/303,574

(22) PCT Filed: May 1, 2014

(86) PCT No.: PCT/JP2014/062056
§ 371 (c)(1),
(2) Date: Oct. 12, 2016

(87) PCT Pub. No.: WO2015/166571
PCT Pub. Date: Nov. 5, 2015

(65) Prior Publication Data
US 2017/0033643 A1 Feb. 2, 2017

(51) Int. Cl.
*H02K 5/22* (2006.01)
*H02K 11/00* (2016.01)
(Continued)

(52) U.S. Cl.
CPC ............... *H02K 5/225* (2013.01); *H02K 5/22* (2013.01); *H02K 9/22* (2013.01); *H02K 11/00* (2013.01); *H02K 11/30* (2016.01)

(58) Field of Classification Search
CPC .......... H02K 5/225; H02K 11/30; H02K 5/22; H02K 9/22; H02K 11/00
See application file for complete search history.

(56) References Cited

U.S. PATENT DOCUMENTS 4,727,274 A * 2/1988 Adam ..................... H02K 5/12
310/239
2003/0127921 A1* 7/2003 Akutsu ................ B62D 5/0406
310/68 R
(Continued)

FOREIGN PATENT DOCUMENTS

CN 103459236 A 12/2013
JP 06-292335 A 10/1994
(Continued)

OTHER PUBLICATIONS

Communication dated Nov. 21, 2017 from the European Patent Office in counterpart application No. 14890610.0.
(Continued)

*Primary Examiner* — Mohamad Musleh
(74) *Attorney, Agent, or Firm* — Sughrue Mion, PLLC; Richard C. Turner (57) ABSTRACT

An external connection connector includes: an insulating resin molded body in which are formed integrally: a second flange portion that is fixed to a first axial end surface of a first bulging portion of a unit housing; an extended portion that extends from the second flange portion alongside an outer circumferential surface of the actuator housing toward the first axial end; a first flange portion that extends radially inward from a first axial end of the extended portion; and a connector portion that is formed on the first flange portion; and a plurality of electrical conductors that are insert-molded into the insulating resin molded body such that first ends thereof protrude inside the connector portion and second ends thereof protrude into a connection window that is formed on a second bulging portion of a heatsink, the electrical conductors being connected to control portion connecting terminals inside the connection window.

7 Claims, 5 Drawing Sheets

(51) Int. Cl.
*H02K 11/30* (2016.01)
*H02K 9/22* (2006.01)

(56) References Cited

U.S. PATENT DOCUMENTS

| | | | |
|---|---|---|---|
| 2005/0167183 A1* | 8/2005 | Tominaga | B62D 5/0406 |
| | | | 180/444 |
| 2007/0246289 A1* | 10/2007 | Tominaga | B62D 5/0406 |
| | | | 180/444 |
| 2013/0300235 A1 | 11/2013 | Akutsu et al. | |
| 2013/0313929 A1 | 11/2013 | Naka et al. | |
| 2014/0091683 A1* | 4/2014 | Ito | B62D 5/0406 |
| | | | 310/68 R |

FOREIGN PATENT DOCUMENTS

| | | |
|---|---|---|
| JP | 2006-081373 A | 3/2006 |
| JP | 2010-028925 A | 2/2010 |
| JP | 2013-247729 A | 12/2013 |

OTHER PUBLICATIONS

Communication dated Feb. 27, 2018 issued by the State Intellectual Property Office of People's Republic of China in counterpart Chinese Application No. 201480078381.3.
International Search Report of PCT/JP2014/062056 dated Jul. 22, 2014.

* cited by examiner

AUTOMOTIVE CONTROLLING APPARATUS

CROSS REFERENCE TO RELATED APPLICATIONS

This application is a National Stage of International Application No. PCT/JP2014/062056 filed on May 1, 2014, the contents of which are incorporated herein by reference in their entirety.

TECHNICAL FIELD

The present invention relates to an automotive controlling apparatus for an electric motor or a generator in which an actuator and a control unit are integrated, and particularly relates to construction of an external connection connector for electrically connecting a battery and a vehicle general electronic control unit (ECU), etc.

BACKGROUND ART

In conventional electric power-steering apparatus motors, a stator and a rotor are housed inside a housing, a terminal carrier, and a controlling circuit board and a driving circuit board that constitute controlling apparatuses, are disposed on an end frame that closes an opening portion of the housing at an opposite end from the stator, the terminal carrier and the controlling apparatuses are covered by a cover member, and a connector portion is disposed integrally on the terminal carrier so as to be positioned radially outside the housing (see Patent Literature 1, for example).

CITATION LIST

Patent Literature

Patent Literature 1: Japanese Patent Laid-Open No. 2010-28925 (Gazette)

SUMMARY OF THE INVENTION

Problem to be Solved by the Invention

In conventional electric power-steering apparatus motors, because the connector portion is disposed integrally on the terminal carrier so as to be positioned radially outside the housing, radial dimensions of the motor are increased. Because the possibility of interference with vehicle-mounted parts in the vicinity of the motor is thereby increased when mounting conventional electric power-steering apparatus motors to a vehicle, one problem has been that installation freedom is reduced.

The present invention aims to solve the above problems and an object of the present invention is to provide an automotive controlling apparatus that can increase installation freedom by disposing a connector portion of an external connection connector at a first axial end of an actuator to reduce radial dimensions and suppress interference with peripheral equipment during mounting to a vehicle.

Means for Solving the Problem

An automotive controlling apparatus according to the present invention includes: an actuator that includes a floored cylindrical actuator housing, a bottom portion of the actuator housing being disposed so as to be oriented toward a first axial end; and a control unit that is disposed coaxially at a second axial end of the actuator, and that is integrated with the actuator. The control unit includes: a unit housing that is formed so as to have a floored cylindrical shape that includes a first bulging portion that bulges radially further outward than the actuator housing, a terminal insertion window being formed on a first axial end surface of the first bulging portion; a heatsink that includes: a second bulging portion that bulges radially further outward than the actuator housing; and a connection window that passes axially through the second bulging portion, the heatsink being mounted to the unit housing so as to cover an opening of the unit housing such that the second bulging portion is stacked together with the first bulging portion; a control portion that includes: control portion connecting terminals that input external signals; and a controlling circuit that controls driving of the actuator, the control portion being housed inside the unit housing such that end portions of the control portion connecting terminals protrude into the connection window; and an external connection connector that includes: an insulating resin molded body in which are formed integrally: a second flange portion that is fixed to the first axial end surface of the first bulging portion; an extended portion that extends from the second flange portion alongside an outer circumferential surface of the actuator housing toward the first axial end; a first flange portion that extends radially inward from a first axial end of the extended portion; and a connector portion that is formed on the first flange portion; and a plurality of electrical conductors that are insert-molded into the insulating resin molded body such that first ends thereof protrude inside the connector portion and second ends thereof protrude into the connection window, the electrical conductors being connected to the control portion connecting terminals inside the connection window.

Effects of the Invention

In the present invention, an extended portion extends axially alongside an outer circumferential surface of an actuator housing from a second flange portion that is fixed to a first axial end surface of a first bulging portion, a first flange portion extends radially inward from a first axial end of the extended portion, and a connector portion is formed on the first flange portion. The connector portion is disposed at the first axial end of an automotive controlling apparatus, where installation of vehicle-mounted parts is less frequent. Increases in radial dimensions of the automotive controlling apparatus are suppressed, reducing the amount of protrusion radially outward from the automotive controlling apparatus, where installation of vehicle-mounted parts is common. Thus, the possibility that the automotive controlling apparatus will interfere with neighboring vehicle-mounted parts during mounting of the automotive controlling apparatus to a vehicle is reduced, increasing the installation freedom of the automotive controlling apparatus.

DESCRIPTION OF EMBODIMENTS

A preferred embodiment of an automotive controlling apparatus according to the present invention will now be explained with reference to the drawings.

Embodiment 1

Figure 1:
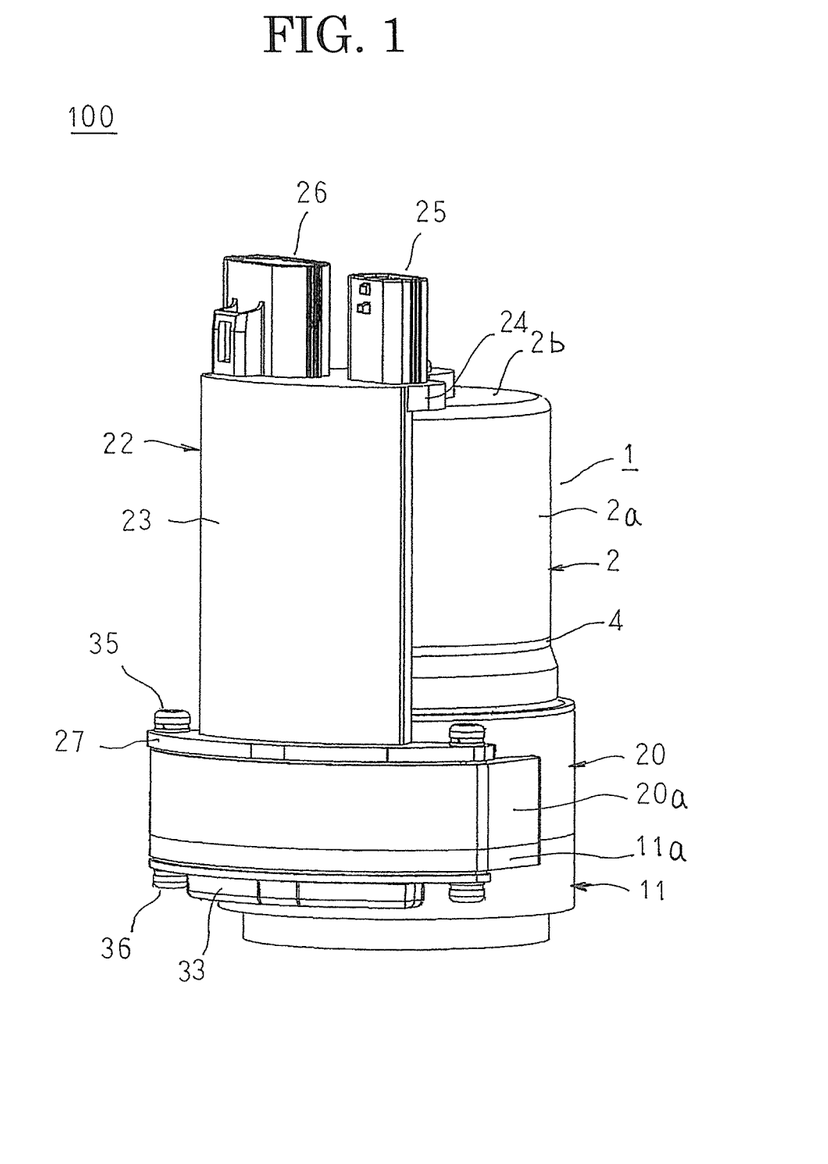
FIG. 1 is an oblique projection that shows an automotive controlling apparatus according to Embodiment 1 of the present invention.
Figure 2:
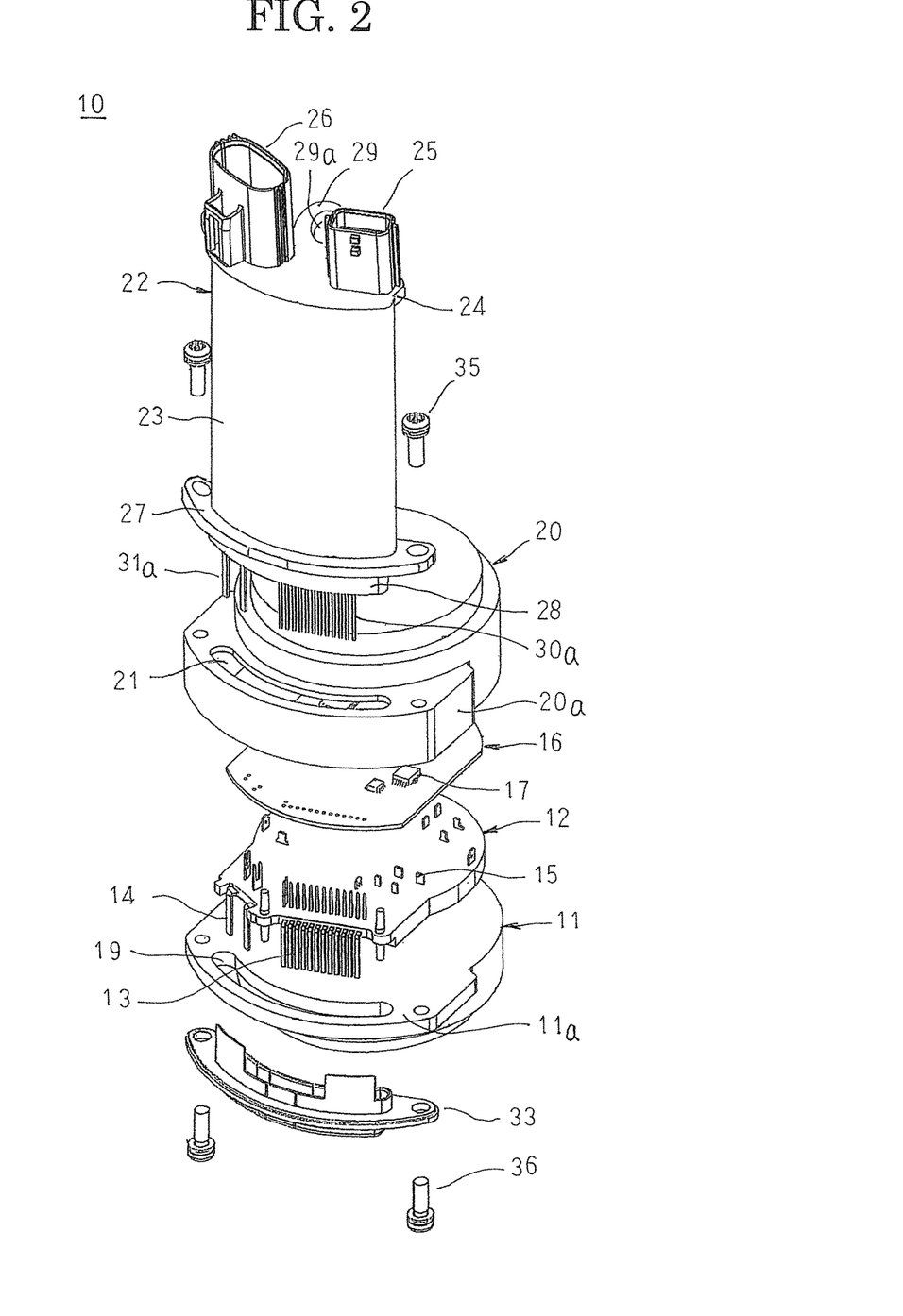
FIG. 2 is an exploded oblique projection that shows a control unit in the automotive controlling apparatus according to Embodiment 1 of the present invention.
Figure 3:
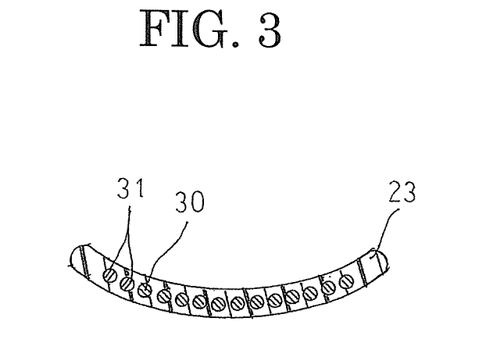
FIG. 3 is a cross section that shows an external connection connector in the automotive controlling apparatus according to Embodiment 1 of the present invention.
Figure 4:
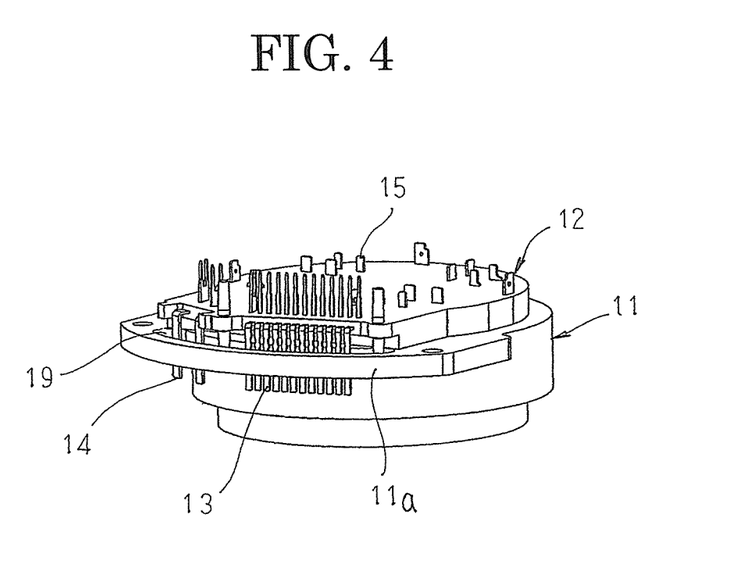
FIG. 4 is an oblique projection that shows a state in which an intermediary member is mounted to a heatsink in the automotive controlling apparatus according to Embodiment 1 of the present invention.
Figure 5:
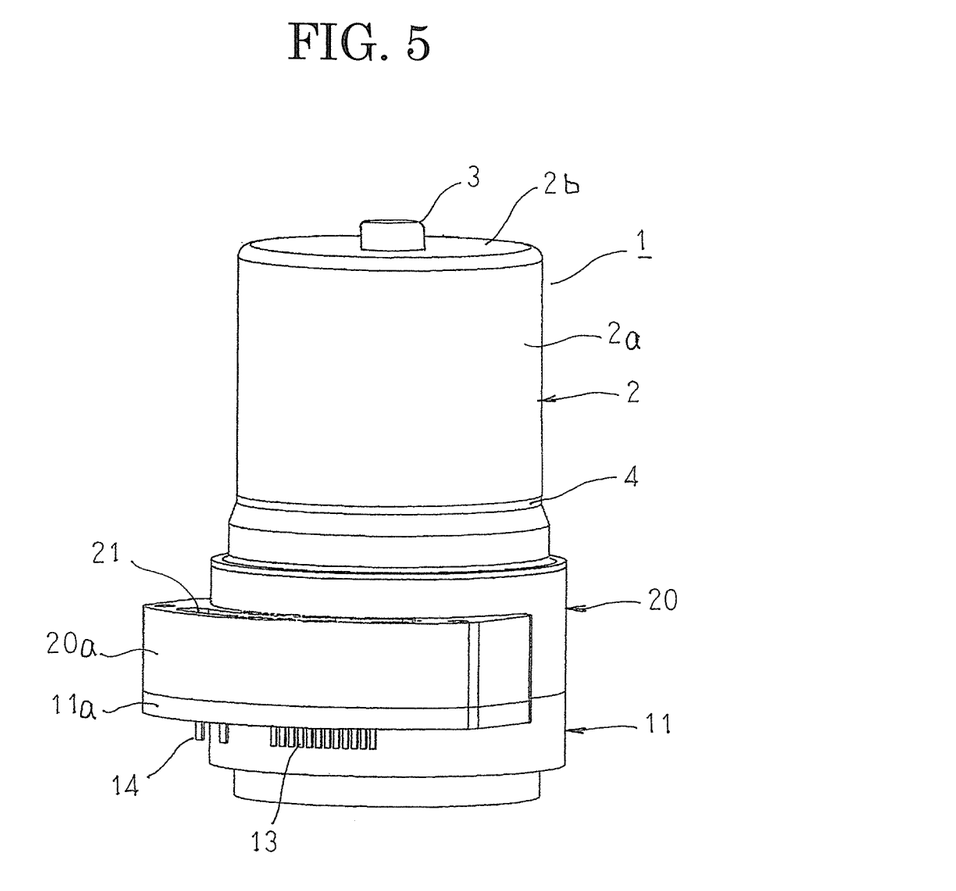
FIG. 5 is an oblique projection that shows a state of the automotive controlling apparatus according to Embodiment 1 of the present invention before mounting the external connection connector.
Figure 6:
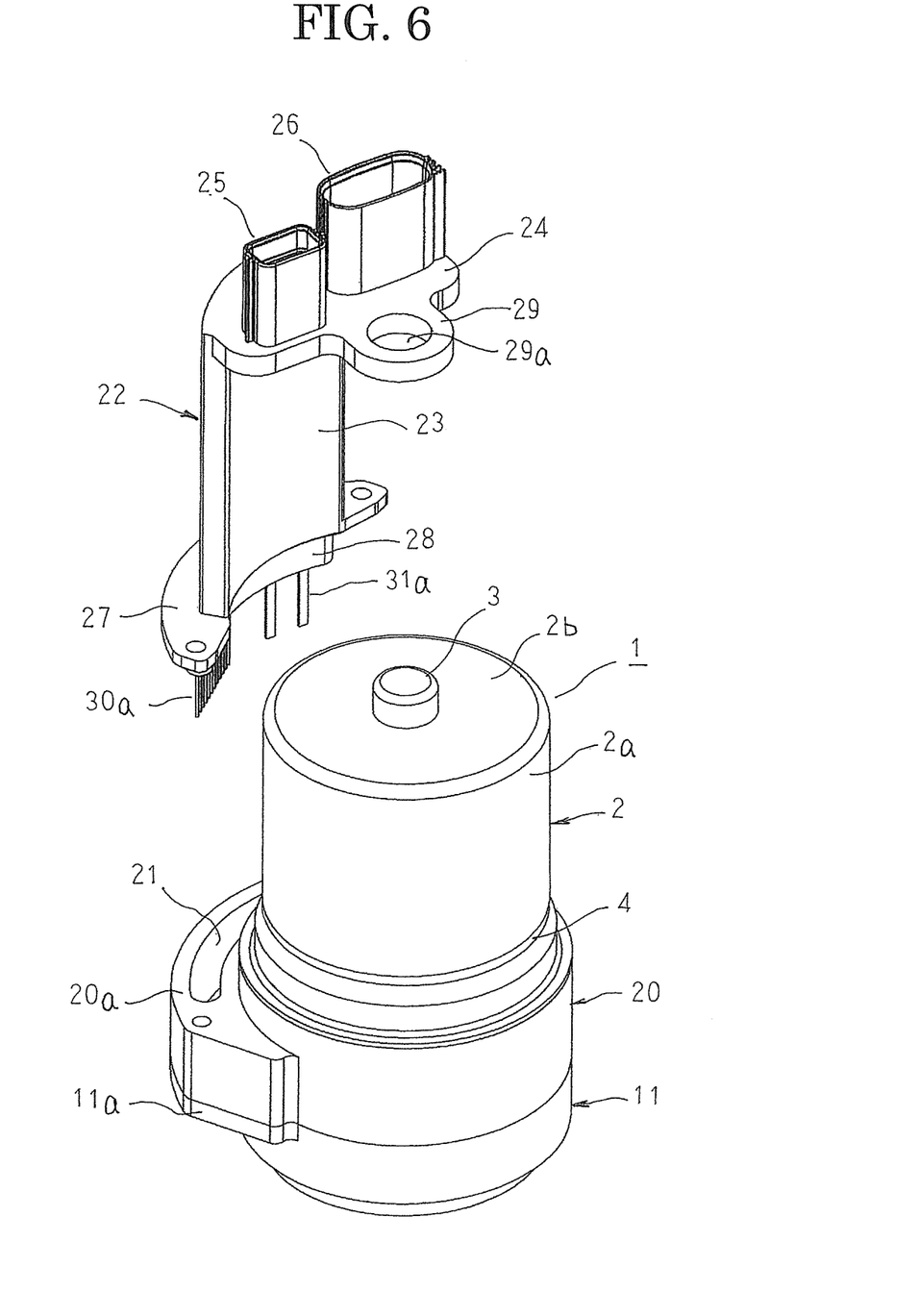
FIG. 6 is an oblique projection that explains a mounting method for the external connection connector in the automotive controlling apparatus according to Embodiment 1 of the present invention.

FIG. 1 is an oblique projection that shows an automotive controlling apparatus according to Embodiment 1 of the present invention, FIG. 2 is an exploded oblique projection that shows a control unit in the automotive controlling apparatus according to Embodiment 1 of the present invention, FIG. 3 is a cross section that shows an external connection connector in the automotive controlling apparatus according to Embodiment 1 of the present invention, FIG. 4 is an oblique projection that shows a state in which an intermediary member is mounted to a heatsink in the automotive controlling apparatus according to Embodiment 1 of the present invention, FIG. 5 is an oblique projection that shows a state of the automotive controlling apparatus according to Embodiment 1 of the present invention before mounting the external connection connector, and FIG. 6 is an oblique projection that explains a mounting method for the external connection connector in the automotive controlling apparatus according to Embodiment 1 of the present invention.

In FIG. 1, an automotive controlling apparatus 100 includes: an electric motor 1 that functions as an actuator; and a control unit 10 that controls driving of the electric motor 1.

The electric motor 1 is a commonly known electric motor and, although not shown in detail, includes: a motor housing 2 that functions as an actuator housing, that is produced so as to have a floored cylindrical shape that is constituted by a cylindrical portion 2a and a bottom portion 2b that closes a first end of the cylindrical portion 2a; a rotor that is fixed to a rotating shaft that is rotatably supported by means of bearings in the bottom portion 2b and in an end plate 4 that closes an opening of the motor housing 2, and that is disposed inside the motor housing 2; and a stator that is held by the motor housing 2 so as to surround the rotor so as to have a constant air gap interposed between the stator and the rotor. Moreover, as shown in FIGS. 5 and 6, an annular boss portion 3 that houses and holds a bearing is formed by expanding a central position of the bottom portion 2b of the motor housing 2 axially outward.

As shown in FIG. 2, the control unit 10 includes: a heatsink 11; an intermediary member 12 that is produced by insert-molding inserted conductors and a plurality of control portion connecting terminals 13 and 14 using an insulating resin; a controlling circuit board 16 to which electronic components 17 are mounted; a unit housing 20 that houses the intermediary member 12 and the controlling circuit board 16 internally; and an external connection connector 22.

First ends of the plurality of control portion connecting terminals 13 each protrude in a vicinity of a first surface of the intermediary member 12, and second ends each protrude from the intermediary member 12 in a vicinity of a second surface so as to be positioned radially outside the motor housing 2, so as to extend in an axial direction, and so as to be arranged in a single row circumferentially. First ends of two control portion connecting terminals 14 each protrude in a vicinity of a first surface of the intermediary member 12, and second ends each protrude from the intermediary member 12 in a vicinity of a second surface so as to be positioned radially outside the motor housing 2, so as to extend in an axial direction, and so as to be separated circumferentially from the group of second ends of the control portion connecting terminals 13. In addition, terminals 15 of the inserted conductors protrude in a vicinity of the first surface of the intermediary member 12.

Various kinds of electronic components 17 that include a microcomputer and switching elements are mounted to the controlling circuit board 16 to configure the driving circuit and the controlling circuit of the electric motor 1, and the controlling circuit board 16 is disposed so as to be stacked near the first surface of the intermediary member 12 to constitute a control portion together with the intermediary member 12. The first ends of the control portion connecting terminals 13 are inserted into and joined together with penetrating apertures that are formed on the controlling circuit board 16 so as to be respectively connected to corresponding signal lines. The first ends of the control portion connecting terminals 14 are inserted into and joined together with penetrating apertures that are formed on the controlling circuit board 16 so as to be respectively connected to an electric power supply line and a ground line. In addition, the terminals 15 are joined to corresponding terminals of the controlling circuit board 16, to form electrical connections among the electronic components 17, and also to hold the controlling circuit board 16.

The heatsink 11 is produced using a material that has superior thermal conduction such as aluminum, and has a second bulging portion 11a in which a circumferential region of a first surface side thereof that passes over a region of arrangement of the second ends of the control portion connecting terminals 13 and 14 is expanded radially further outward than the motor housing 2, and a circular arc-shaped connection window 19 that corresponds to the region of arrangement of the second ends of the control portion connecting terminals 13 and 14 is formed so as to pass through the second bulging portion 11a. As shown in FIG. 4, the intermediary member 12 is mounted to the first surface of the heatsink 11 so as to place a second surface in close contact therewith such that the second ends of the control portion connecting terminals 13 and 14 are inserted into the connection window 19.

The unit housing 20 is produced using an insulating resin so as to have a floored cylindrical shape that is constituted by a cylindrical portion and a bottom portion that closes a first end of the cylindrical portion, and in addition has a first bulging portion 20a in which a circumferential region of a second surface side of the cylindrical portion that passes over a region of arrangement of the second ends of the control portion connecting terminals 13 and 14 is expanded radially further outward than the motor housing 2, and a circular arc-shaped terminal insertion window 21 that corresponds to the region of arrangement of the second ends of the control portion connecting terminals 13 and 14 is formed so as to pass through a side wall that is perpendicular to a central axis, that is positioned at a first axial end of the first bulging portion 20a. Moreover, an external shape of an opening of the unit housing 20 matches approximately with an external shape of the first surface side of the heatsink 11.

As shown in FIG. 5, the heatsink 11 is stacked on the unit housing 20 from a side near the opening of the unit housing 20 so as to align the second bulging portion 11a with the first bulging portion 20a, and is fixed by fastening to the unit housing 20. An opening portion of the unit housing 20 is thereby closed by the heatsink 11, and the intermediary member 12 and the controlling circuit board 16 are housed inside the unit housing 20. The connection window 19 and the terminal insertion window 21 also face each other in an axial direction, and the second ends of the control portion connecting terminals 13 and 14 pass through the connection window 19 and protrude externally.

The external connection connector 22 is a resin molded body that is produced by insert-molding a plurality of signal transmitting conductors 30 and two electric power supplying conductors 31 that constitute electrical conductors using an insulating resin. The external connection connector 22 includes: an extended portion 23 that is formed so as to have a circular arc-shaped cross-sectional shape, and that extends alongside an outer circumferential surface of the motor housing 2 toward a first axial end; a first flange portion 24 that is formed so as to protrude radially inward and in two circumferential directions from a first end of the extended portion 23; a first connector portion 25 and a second connector portion 26 that are formed so as to protrude outward from the first flange portion 24 at a first axial end, and so as to be positioned radially further inward than an outer circumference of the motor housing 2; a second flange portion 27 that is formed so as to have an external shape that conforms to an external shape of a first axial end surface of the first bulging portion 20a, and that protrudes radially and circumferentially from a second end of the extended portion 23; a holding portion 28 that is formed so as to have a circular arc-shaped cross-sectional shape that approximately matches an aperture shape of the terminal insertion window 21, and that protrudes toward a second axial end from the second end of the extended portion 23; and a fixing portion 29 that protrudes radially inward from the first flange portion 24, and on which is formed an interfitting aperture 29a that fits together with the boss portion 3.

The plurality of signal transmitting conductors 30 are embedded in the extended portion 23 and the first flange portion 24, first ends thereof protrude into the first connector portion 25, and second ends thereof protrude outward from the holding portion 28 so as to be positioned radially further outward than a motor housing 2, so as to extend in an axial direction, and so as to be arranged in a single row circumferentially, to constitute signal transmitting connecting terminals 30a. The two electric power supplying conductors 31 are embedded in the extended portion 23 and the first flange portion 24, first ends thereof protrude into the second connector portion 26, and second ends thereof protrude outward from a second end of the holding portion 28 so as to be positioned radially further outward than a motor housing 2, so as to extend in an axial direction, and so as to be separated circumferentially from the group of signal transmitting connecting terminals 30a, to constitute electric power supplying connecting terminals 31a. Moreover, as shown in FIG. 3, the signal transmitting conductors 30 and the electric power supplying conductors 31 are embedded inside the extended portion 23 so as to line up in a single row circumferentially.

The external connection connector 22 is mounted to the unit housing 20 by fitting the holding portion 28 into the terminal insertion window 21, and fastening the second flange portion 27 to the first axial end surface of the first bulging portion 20a of the unit housing 20 using mounting screws 35, and covers the terminal insertion window 21. The signal transmitting connecting terminals 30a that protrude outward from the holding portion 28 each pass through the terminal insertion window 21 and the connection window 19, and protrude externally in close proximity to a radially outer side of the second ends of the control portion connecting terminals 13. The electric power supplying connecting terminals 31a similarly pass through the terminal insertion window 21 and the connection window 19, and protrude externally in close proximity to a radially outer side of the second ends of the control portion connecting terminals 14. The signal transmitting connecting terminals 30a and the control portion connecting terminals 13 are joined together, and the electric power supplying connecting terminals 31a and the control portion connecting terminals 14 are joined together.

A protective cover 33 is a resin molded body that is made of an insulating resin, and is mounted to the heatsink 11 by being fastened to a second axial end surface of the second bulging portion 11a of the heatsink 11 using mounting screws 36. The joint portions between the signal transmitting connecting terminals 30a and the control portion connecting terminals 13 and the joint portions between the electric power supplying connecting terminals 31a and the control portion connecting terminals 14 are thereby covered and protected by the protective cover 33.

To assemble the automotive controlling apparatus 100 that is configured in this manner, the intermediary member 12 and the controlling circuit board 16 are first mounted to the heatsink 11. Next, the heatsink 11 is stacked together with the unit housing 20 from a side near the opening of the unit housing 20 such that the second bulging portion 11a is aligned with the first bulging portion 20a, and the heatsink 11 is fastened to the unit housing 20 to integrate the two. The opening of the unit housing 20 is thereby closed by the heatsink 11, and the intermediary member 12 and the controlling circuit board 16 are stacked and housed inside the unit housing 20 so as to be perpendicular to the axial direction.

Next, as shown in FIG. 5, the unit housing 20 onto which the heatsink 11 is mounted is coupled coaxially to the second axial end of the electric motor 1. Next, as shown in FIG. 6, the extended portion 23 is placed alongside the outer circumferential surface of the cylindrical portion 2a of the motor housing 2 of the electric motor 1, and the external connection connector 22 is moved from the first axial end toward the second axial end. The signal transmitting connecting terminals 30a and the electric power supplying connecting terminals 31a thereby enter the terminal insertion window 21, and the holding portion 28 is fitted into the terminal insertion window 21.

When the second flange portion 27 contacts the first axial end surface of the first bulging portion 20a of the unit housing 20, the signal transmitting connecting terminals 30a are disposed so as to face the second ends of the control portion connecting terminals 13 in close proximity, and the electric power supplying connecting terminals 31a are disposed so as to face the second ends of the control portion connecting terminals 14 in close proximity. The boss portion 3 of the motor housing 2 is also press-fitted into the interfitting aperture 29a of the fixing portion 29. The mounting screws 35 are then passed through the second flange portion 27 and fastened to the first bulging portion 20a such that the external connection connector 22 is fixed to the unit housing 20. A press-fitted state between the fixing portion 29 and the boss portion 3 is held thereby such that the fixing portion 29 is fixed to the motor housing 2 by means of the boss portion 3.

Next, the signal transmitting connecting terminals 30a and the control portion connecting terminals 13 that protrude out of the connection window 19 are joined, and the electric power supplying connecting terminals 31a and the control portion connecting terminals 14 are joined. Finally, the automotive controlling apparatus 100 that is shown in FIG. 1 is assembled by fastening the protective cover 33 to the second axial end surface of the second bulging portion 11a of the heatsink 11 using mounting screws 36.

According to Embodiment 1, an external connection connector 22 is disposed such that first and second connector portions 25 and 26 are positioned at a first axial end of a motor housing 2 of an electric motor 1 radially further inward than an outer circumference of the motor housing 2, and such that an extended portion 23 extends axially alongside an outer circumferential surface of the motor housing 2 of the electric motor 1. In this manner, the first and second connector portions 25 and 26 are disposed at the first axial end of the automotive controlling apparatus 100, where installation of vehicle-mounted parts is less frequent. The first and second connector portions 25 and 26 are disposed radially further inward than the outer circumference of the motor housing 2, and the extended portion 23 is disposed alongside the outer circumferential surface of the motor housing 2 of the electric motor 1. Increases in radial dimensions of the automotive controlling apparatus 100 are thereby suppressed, reducing the amount of protrusion radially outward from the automotive controlling apparatus 100, where installation of vehicle-mounted parts is more frequent. Thus, the possibility that the automotive controlling apparatus 100 will interfere with neighboring vehicle-mounted parts during mounting of the automotive controlling apparatus 100 to a vehicle is reduced, increasing the installation freedom of the automotive controlling apparatus 100.

The second flange portion 27 is fixed to the first bulging portion 20a of the unit housing 20, and the fixing portion 29 is fixed to the bottom portion 2b of the motor housing 2 by means of the boss portion 3. Because two ends of the external connection connector 22 are fixed in this manner, even if large loads act on the external connection connector 22 when inserting and removing vehicle connectors to and from the first and second connector portions 25 and 26, the occurrence of situations such as that the external connection connector 22 being damaged is suppressed.

Because the interfitting aperture 29a is formed on the fixing portion 29, and the fixing portion 29 is fixed to the motor housing 2 by press-fitting the boss portion 3 of the motor housing 2 into the interfitting aperture 29a, it is not necessary to fix the fixing portion 29 to the motor housing 2 using a separate member, enabling the number of parts to be reduced.

The external connection connector 22 is removably mounted to the unit housing 20. Thus, because circumferential positions and directions of insertion and removal of the first and second connector portions 25 and 26 can be made to conform to specifications required by the vehicle to which it is mounted simply by replacing only the external connection connector 22, other parts except for the external connection connector 22 can be standardized, enabling reductions in cost of the automotive controlling apparatus 100 to be achieved.

Because a plurality of signal transmitting conductors 30 and electric power supplying conductors 31 are insert-molded into the extended portion 23, rigidity of the extended portion 23 is increased. Thus, measures for improving rigidity such as adding glass fibers to the insulating resin that constitutes the external connection connector 22 are no longer required, enabling reductions in the cost of the external connection connector 22 to be achieved.

Because the signal transmitting conductors 30 and the electric power supplying conductors 31 are insert-molded into the extended portion 23 so as to be arranged in a single row circumferentially, radial thickness of the extended portion 23 is thin, enabling the radial dimensions of the automotive controlling apparatus 100 to be reduced.

First ends of the signal transmitting conductors 30 protrude into the first connector portion 25, and first ends of the electric power supplying conductors 31 protrude into the second connector portion 26. Second ends of the electric power supplying conductors 31 protrude into a region on a first circumferential side inside a connection window 19, and second ends of the signal transmitting conductors 30 protrude into a remaining region inside the connection window 19. Thus, the first connector portion 25 and the second connector portion 26 can be disposed at any location without being subjected to positional constraints of the connection window 19, and electrical connection inside the control unit 10 is also made possible.

Moreover, in Embodiment 1 above, an electric motor is used as an actuator, but a generator may be used as the actuator.

In Embodiment 1 above, a fixing portion is fixed to a bottom portion of a motor housing by press-fitting an interfitting aperture that is formed on the fixing portion onto a boss portion, but a fixing portion may be fixed to the bottom portion of the motor housing using screws, etc.

In Embodiment 1 above, first and second connector portions are positioned radially further inward than an outer circumference of a motor housing, but it is only necessary that the first and second connector portions do not protrude radially further outward than the extended portion.

In Embodiment 1 above, signal transmitting conductors and electric power supplying conductors are insert-molded into an extended portion so as to be arranged in a single row circumferentially, but if there is sufficient clearance in a radial dimension, signal transmitting conductors and electric power supplying conductors may be insert-molded into an extended portion so as to be arranged in two rows circumferentially. Alternatively, the signal transmitting conductors, which are larger in number, may be insert-molded into an extended portion so as to be arranged in two rows circumferentially, and the electric power supplying conductors, which are smaller in number, arranged in a single row circumferentially so as to be circumferentially adjacent thereto.

In Embodiment 1 above, first ends of all signal transmitting conductors protrude into a second connector portion, but a third connector portion may be installed so as to be adjacent to a second connector portion, and first ends of half of the signal transmitting conductors made protrude into the second connector portion, and first ends of remaining signal transmitting conductors made to protrude into the third connector portion.

The invention claimed is:

1. An automotive controlling apparatus comprising:
   an actuator that comprises a floored cylindrical actuator housing, a bottom portion of said actuator housing being disposed so as to be oriented toward a first axial end; and
   a control unit that is disposed coaxially at a second axial end of said actuator, and that is integrated with said actuator,
   wherein said control unit comprises:
   a unit housing that is formed so as to have a floored cylindrical shape that comprises a first bulging portion that bulges radially further outward than said actuator housing, a terminal insertion window being formed on a first axial end surface of said first bulging portion;
   a heatsink that comprises:
     a second bulging portion that bulges radially further outward than said actuator housing; and
     a connection window that passes axially through said second bulging portion,
     said heatsink being mounted to said unit housing so as to cover an opening of said unit housing such that said second bulging portion is stacked together with said first bulging portion;
   a control portion that comprises:
     control portion connecting terminals that input external signals; and
     a controlling circuit that controls driving of said actuator,
     said control portion being housed inside said unit housing such that end portions of said control portion connecting terminals protrude into said connection window; and
   an external connection connector that comprises:
     an insulating resin molded body in which are formed integrally:
       a second flange portion that is fixed to said first axial end surface of said first bulging portion;
       an extended portion that extends from said second flange portion alongside an outer circumferential surface of said actuator housing toward said first axial end;
       a first flange portion that extends radially inward from a first axial end of said extended portion; and
       a connector portion that is formed on said first flange portion; and
     a plurality of electrical conductors that are insert-molded into said insulating resin molded body such that first ends thereof protrude inside said connector portion and second ends thereof protrude into said connection window, said electrical conductors being connected to said control portion connecting terminals inside said connection window.

2. The automotive controlling apparatus according to claim 1, wherein said plurality of electrical conductors are embedded in said extended portion so as to each extend in an axial direction so as to be arranged in a single row in a circumferential direction.

3. The automotive controlling apparatus according to claim 1, wherein:
   a boss portion is formed at a central position on said bottom portion of said actuator housing;
   an interfitting aperture is formed on an end of said first flange portion that protrudes radially inward; and
   said external connection connector is fixed to said bottom portion of said actuator by press-fitting said boss portion into said interfitting aperture.

4. The automotive controlling apparatus according to claim 1, wherein:
   said connector portion comprises a first connector portion and a second connector portion;
   said plurality of electrical conductors comprise signal transmitting conductors and electric power supplying conductors;
   a group of first ends of said signal transmitting conductors and a group of first ends of said electric power supplying conductors protrude so as to be distributed between an internal portion of said first connector portion and an internal portion of said second connector portion, respectively; and
   a group of second ends of said signal transmitting conductors and a group of second ends of said electric power supplying conductors respectively protrude into said connection window so as to be distributed circumferentially.

5. The automotive controlling apparatus according to claim 2, wherein:
   a boss portion is formed at a central position on said bottom portion of said actuator housing;
   an interfitting aperture is formed on an end of said first flange portion that protrudes radially inward; and
   said external connection connector is fixed to said bottom portion of said actuator by press-fitting said boss portion into said interfitting aperture.

6. The automotive controlling apparatus according to claim 2, wherein:
   said connector portion comprises a first connector portion and a second connector portion;
   said plurality of electrical conductors comprise signal transmitting conductors and electric power supplying conductors;
   a group of first ends of said signal transmitting conductors and a group of first ends of said electric power supplying conductors protrude so as to be distributed between an internal portion of said first connector portion and an internal portion of said second connector portion, respectively; and
   a group of second ends of said signal transmitting conductors and a group of second ends of said electric power supplying conductors respectively protrude into said connection window so as to be distributed circumferentially.

7. The automotive controlling apparatus according to claim 5, wherein:
   said connector portion comprises a first connector portion and a second connector portion;
   said plurality of electrical conductors comprise signal transmitting conductors and electric power supplying conductors;
   a group of first ends of said signal transmitting conductors and a group of first ends of said electric power supplying conductors protrude so as to be distributed between an internal portion of said first connector portion and an internal portion of said second connector portion, respectively; and
   a group of second ends of said signal transmitting conductors and a group of second ends of said electric power supplying conductors respectively protrude into said connection window so as to be distributed circumferentially.

* * * * *